United States Patent [19]
Hori et al.

[11] Patent Number: 5,860,034
[45] Date of Patent: Jan. 12, 1999

[54] EYEPIECE SHUTTER FOR USE WITH A CAMERA

[75] Inventors: Masakatsu Hori; Tetsuro Tani, both of Tokyo, Japan

[73] Assignee: Asahi Kogaku Kogyo Kabushiki Kaisha, Tokyo, Japan

[21] Appl. No.: 882,493

[22] Filed: Jun. 25, 1997

[30] Foreign Application Priority Data

Jul. 4, 1996 [JP] Japan .................................. 8-195663

[51] Int. Cl.⁶ .................................................. G03B 13/02
[52] U.S. Cl. ........................................................ 396/373
[58] Field of Search ................................. 396/373, 457; 348/341

[56] References Cited

U.S. PATENT DOCUMENTS 3,975,750  8/1976  Yoshino et al. ......................... 396/373
4,853,787  8/1989  Kurth ....................................... 348/341
5,619,266  4/1997  Tomita et al. ...................... 396/457 X

*Primary Examiner*—W. B. Perkey
*Attorney, Agent, or Firm*—Sughrue, Mion, Zinn, Macpeak & Seas, PLLC

[57] ABSTRACT

When a shutter release button is pressed, a shutter drive member (8) moves downward in conjunction with the pressing action of the shutter release button. As a result, a lever (28) pivots clockwise, and a lever (26) whose lever piece (30) is connected at the front end to the lever (28) by a torsion spring (50) pivots counterclockwise. By means of a lever piece (34), an elongated hole (36), and a pin (24A), the light-shielding plate (12) moves to the lowermost position where pins (22, 23) come into contact with the lowermost ends of elongated holes (18, 20). As a result, the opening (14) of the base plate (10) and the finder eyepiece window (16) are closed by the light-shielding plate (12), whereby the optical path of the finder optical system is interrupted. Thereafter, a metering operation for automatic exposure purposes is performed.

25 Claims, 7 Drawing Sheets

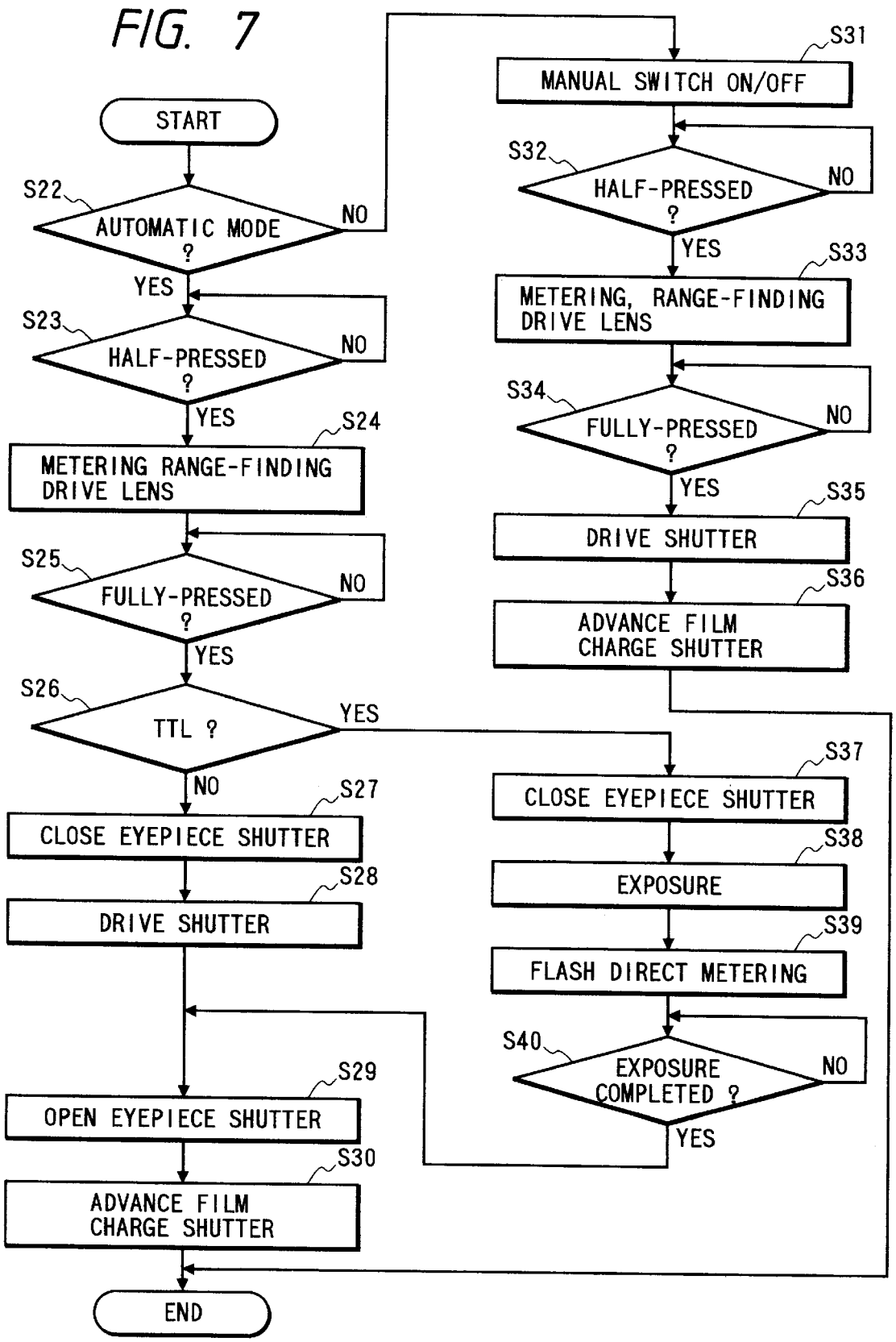

EYEPIECE SHUTTER FOR USE WITH A CAMERA

BACKGROUND OF THE INVENTION

The present invention relates to a device for automatically opening/closing an optical path of a finder optical system of a camera.

Many cameras are provided with TTL-photometry type automatic exposure mechanism in which a photometry light-receiving element is provided within the main body of the camera. The quantity of the light entered through an objective lens is metered by the photometry light-receiving element, and a diaphragm is automatically adjusted.

In the case of a camera, such as a single-lens reflex camera, in which there is a partial overlap between the optical path of a finder optical system and the optical path of an image pick-up optical system, if a shutter release button is pressed while the photographer's eye is remote from a finder eyepiece window, e.g. the shutter release button is remotely operated while the camera is fixed on a tripod, the light entered from the finder eyepiece window affects the light-receiving element, obstructing the metering of the quantity of light. As a result, the diaphragm is erroneously adjusted.

In the case of another type of camera which uses a pellicle mirror as the major mirror and does not cause the mirror to swing up, if the shutter release button is pressed while the photographer's eye is remote from the finder eyepiece window, a fog occurs (which is caused by the light inversely entered from the finder eyepiece window while a film is exposed to the light of an object with the shutter being released), resulting in overexposure in some cases.

To prevent these problems, an eyepiece shutter is provided for the finder eyepiece window to prevent light from entering into the camera through the finder eyepiece window.

To close the finder eyepiece window through use of the conventional eyepiece shutter, various manual operations are required. It is necessary to press the shutter release button as well as to manually close the eyepiece shutter, rendering the operation of the camera very inconvenient.

SUMMARY OF THE INVENTION

The present invention has been conceived to solve such drawback, and an object of the present invention is to provide an automatic eyepiece shutter for use with a camera which is capable of correctly metering light as well as automatically opening/closing the eyepiece shutter by pressing only a shutter release button.

Another object of the present invention is to provide an automatic eyepiece shutter for use with a camera which is capable of correctly permitting exposure as well as automatically opening/closing an eyepiece shutter by pressing only a shutter release button.

To accomplish the foregoing objects, the present invention provides a camera equipped with a TTL-photometry type automatic exposure mechanism, the camera characterized by comprising finder opening/closing means for creating a first state in which an optical path of a finder optical system is interrupted and a second state in which the optical path becomes open; and control means which is operated by a shutter release button and brings the finder opening/closing means to the first state at least at the time of a metering operation for automatic exposure.

The present invention provides a camera equipped with a finder optical system, characterized by comprising:

finder opening/closing means for creating a first state in which an optical path of a finder optical system is interrupted and a second state in which the optical path becomes open; and control means which is operated by a shutter release button and brings the finder opening/closing means to the first state at least at the time of exposure.

The present invention is characterized by commencement of a metering operation of a light-receiving element for metering purposes after the finder opening/closing means has been brought into the first state.

The camera, according to the present invention, is arranged such that the finder opening/closing means is brought into the second state by pressing the shutter release button half, and the metering operation is performed in the second state. Further, when the shutter release button is pressed fully, the finder opening/closing means is brought into the first state.

The present invention is further characterized by the fact that the finder opening/closing means includes a light-shielding member for interrupting the optical path, and that the first and second states are created by movement of the light-shielding member.

The present invention is further characterized by the fact that the light-shielding member is arranged so as to confront with the finder eyepiece window.

The present invention is further characterized by the fact that the control means includes a linking mechanism which moves the light-shielding member in conjunction with the pressing action of the shutter release button of the camera.

The present invention is characterized by further comprising light-shielding member block means for preventing the finder opening/closing means from being brought into the first state by hindering the movement of the light-shielding member.

The present invention is further characterized by the fact that the light-shielding member block means is manually operable.

The present invention is further characterized by the fact that the control means comprises an electric actuator.

The present invention is further characterized by the fact that the electric actuator is an electromagnetic plunger.

The present invention is characterized by the fact that the finder opening/closing means is equipped with a liquid-crystal shutter capable of permitting passage or interruption of light in the optical path, and that the first and second states are created according to variations in the optical state of the liquid-crystal shutter.

The present invention is further characterized by the fact that the control means changes the optical state of the liquid-crystal shutter in conjunction with the pressing action of the shutter release button of the camera.

The present invention is further characterized by the fact that the camera is a single-lens reflection camera.

The present invention is further characterized by the fact that the single-lens reflection camera is provided with finder opening/closing means for opening/closing an optical path of a finder optical system in conjunction with the pressing action of the shutter release button of the camera.

The present invention is further characterized by the fact that the single-lens reflection camera uses a pellicle mirror as the major mirror.

The present invention is further characterized by the fact that the optical path of the finder optical system is interrupted at least at the time of a metering operation.

The present invention is further characterized by the fact that the optical path of the finder optical system is interrupted at least at the time of exposure.

The present disclosure relates to subject matter contained in Japanese patent application No. 8-195663 (filed on Jul. 4, 1996) which is expressly incorporated herein by reference in its entirety.

BRIEF DESCRIPTION OF THE DRAWINGS

In the accompanying drawings:

FIG. 7 is a flowchart describing procedures for operating the automatic eyepiece shutter and the shutter release button according to the second embodiment.

DETAILED DESCRIPTION OF THE PREFERRED EMBODIMENTS

With reference to the accompanying drawings, embodiments of the present invention will be described.

Figure 1:
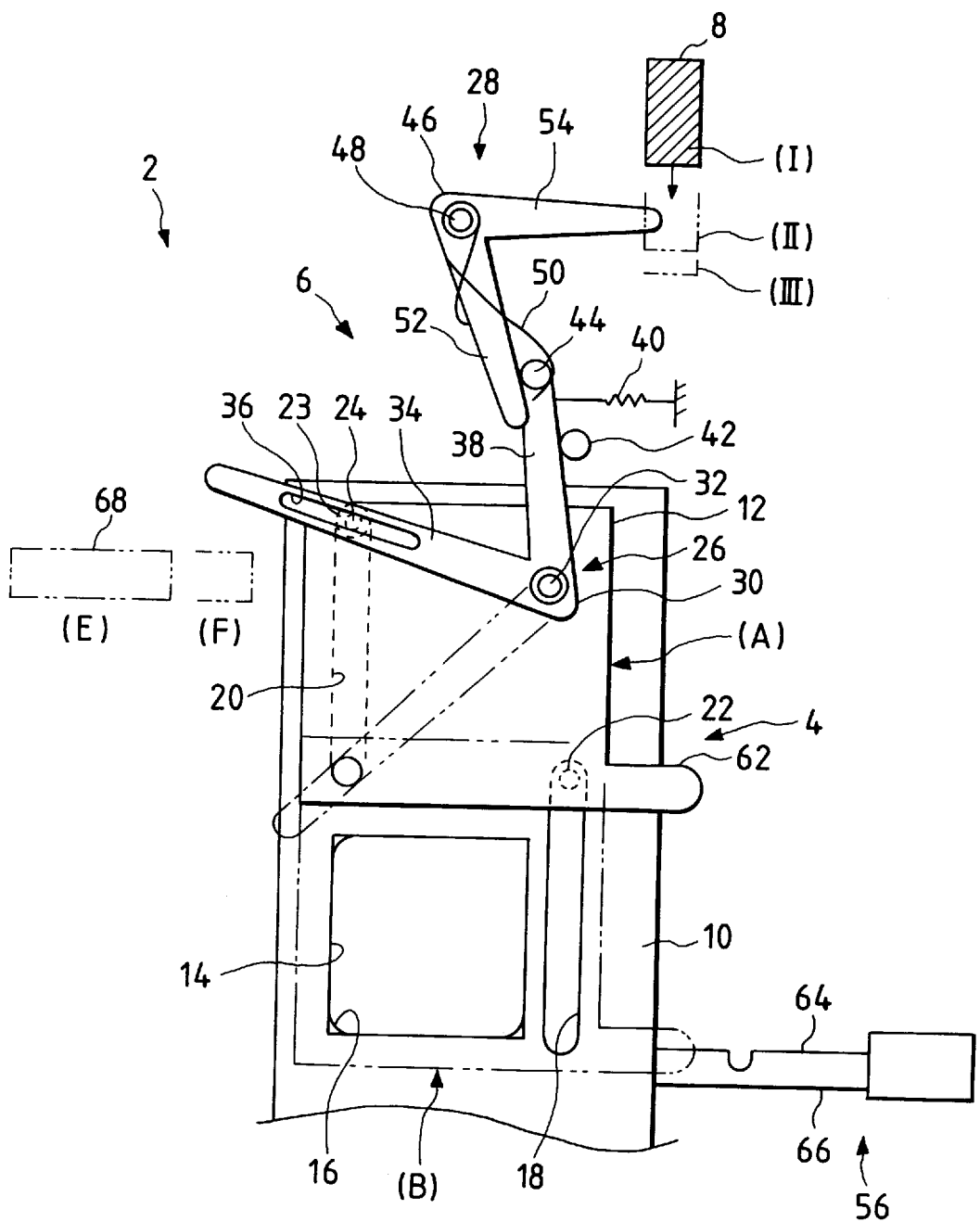
FIG. 1 is a schematic representation illustrating one example of an automatic eyepiece shutter according to a first embodiment of the present invention.

FIG. 1 is a schematic representation of an automatic eyepiece shutter according to a first embodiment of the present invention.

As illustrated in FIG. 1, the automatic eyepiece shutter 2 is provided in a single-lens reflection camera. This single-lens reflection camera has a finder optical system and a TTL-photometry automatic exposure mechanism, etc. Further, a light-receiving element for metering the quantity of light entered from an objective lens is provided in the main body of the camera. There is a partial overlap between an optical path of the finder optical system and an optical path of an image pick-up optical system via a reflection mirror.

The automatic eyepiece shutter 2 includes a finder opening/closing means 4, a control means 6 for controlling the finder opening/closing means 4, and a shutter drive member 8. The automatic eyepiece shutter 2 is accommodated in the main body of the camera.

The finder opening/closing means 4 is made up of a base plate 10, a light-shielding plate 12 (corresponding to the light-shielding member of the present invention) and so on. A rectangular opening 14 is formed in the base plate 10, and the base plate 10 is provided inside with respect to the finder eyepiece window 16 and fixed to the main body of the camera such that the opening 14 substantially matches with the finder eyepiece window 16.

Elongated holes 18 and 20 are formed at opposite sides with respect to the opening 14 and in lower and upper portions of the base plate 10 so as to be elongated vertically. These holes 18 and 20 are elongated substantially in parallel with each other.

The light-shielding plate 12 is approximately rectangular and has a sufficient area to close the opening 14 of the base plate 10. The light-shielding plate 12 is superimposed on the base plate 10 while the sides of the light-shielding plate 12 are aligned substantially parallel with the respective sides of the opening 14.

Pins 22 and 23 stand upright in upper and lower portions of the light-shielding plate 12 in such a way that the opening 14 is placed substantially between the pins 22 and 23, and the pins 22 and 23 are loosely fitted into the respective elongated holes 18 and 20, respectively.

The control means 6 is comprised of substantially L-shaped levers 26 and 28.

The lever 26 is supported at its bent portion 30 by a pivot 32 attached to the main body of the camera and can pivot about the pivot 32 within a plane substantially parallel with the plane of the light-shielding plate 12.

An elongated hole 36 is formed in one lever piece 34 of the lever 26, and the pin 24 stands upright on the light-shielding plate 12 loosely fits into the elongated hole 36.

An upper portion of another lever piece 38 of the lever 26 is forced clockwise by a coil spring 40 which is coupled at one end to the main body of the camera. A pin 44 stands upright on the distal end of the lever piece 38.

The clockwise pivotal movement of the lever 26 is limited by contact between the lever piece 38 and a stopper 42 formed on the main body of the camera. At this time, the lever piece 38 extends upward beyond the base plate 10, and the light-shielding plate 12 is retracted to a position above the opening 14, resulting in a second state (A) of the present invention in which the opening 14 is open.

The lever 28 is positioned opposite to the light-shielding plate 12 while the lever 26 is interposed between them. A bent portion 46 of the lever 28 is supported by a pivot 48 attached to the main body of the camera. The lever 28 can pivot about the pivot 48 within a plane substantially parallel with the plane of the light-shielding plate 12.

A wire-like torsion spring 50 has its center retained on the pivot 48 and is engaged at both ends with a lever piece 52 of the lever 28 and the pin 44 of the lever piece 38 of the lever 26. As a result, the distal end of the lever piece 52 remains constantly in contact with the pin 44 of the lever piece 38.

Since the lever piece 38 of the lever 26 is forced by the spring 40 as previously described, a lever piece 54 of the lever 28 is constantly held in a substantially extended state in a horizontal direction as shown in the drawing.

The shutter drive member 8 performs the opening/closing of a shutter of the single-lens reflection camera and the swinging up/down of a mirror. This shutter drive member 8 reciprocates linearly in conjunction with the action of the shutter release button. In the present invention, the shutter drive member 8 may be a shutter release button itself.

In the drawing, position I of the shutter drive member 8 designates a normal position of the shutter release button when no finger is in contact with it; position II designates a position where the shutter release button is pressed, and the light-receiving element commences a metering operation for automatic exposure purposes; and position III designates a position where the shutter release button is pressed further to thereby open a shutter.

When the shutter release button is pressed, the end of the shutter drive member 8 comes into contact with the distal end of the lever piece 54 of the lever 28, in turn pivoting the lever piece 54. As a result, the lever 26 pivots via the torsion spring 50, and the light-shielding plate 12 moves via the pin 24 and the elongated hole 36. Before the shutter drive member 8 arrives at position II, the pins 22 and 23 come into contact with the lowermost ends of the elongated holes 18 and 20, thereby resulting in a first state (B) in which the opening 14 is closed by the light-shielding plate 12.

In the embodiment, the levers 26 and 28 and the torsion spring 50 form a linking mechanism which moves the light-shielding plate 12 in conjunction with the shutter release button of the camera.

A protrusion 62 is formed on a lower right end of the light-shielding plate 12 so as to project sideward in parallel with the plane of the light-shielding plate 12. A switch 56 is provided on the main body of the camera so as to face the protrusion 62.

The switch 56 has two contact pieces 64 and 66, and these contact pieces 64 and 66 are pressed by the protrusion 62 of the light-shielding plate 12 immediately before the light-shielding plate 12 is brought into the first state (B). The contact pieces 64 and 66 come into contact with each other, thereby bringing the switch 56 in conduction. After it is detected that the switch 56 has been brought in conduction, the light-receiving element performs a metering operation.

With such an arrangement, in a case where a finger is not in contact with the shutter release button; namely, in a case where the shutter of the camera is closed, the end of the shutter drive member 8 is spaced apart from the lever piece 54 of the lever 28 as indicated by position I.

As a result of the lever 26 being forced clockwise by the spring 40, the lever 26 is brought into contact with the stopper 42.

For this reason, the light-shielding plate 12 is forced upwards via the lever piece 34, resulting in the second state (A) in which the light-shielding plate 12 is held in an elevated open position.

At this time, the finder eyepiece window 16 is not closed by the light-shielding plate 12 and becomes open through the opening 14 of the base plate 10.

More specifically, when the shutter of the camera is closed, the finder eyepiece window 16 becomes open, and an operator of the camera can visually observe the object through a viewfinder.

Next, the shutter release button is pressed further to thereby release the shutter of the camera. In conjunction with this releasing action of the shutter, the shutter drive member 8 moves downwardly and presses the lever piece 54 of the lever 28.

Then, the lever 28 pivots clockwise, whereas the lever 26 pivots counterclockwise against the torsion spring 50. The light-shielding plate 12 moves to a light-shielding position (indicated by a two-dot chain line) via the elongated hole 36 and the pin 24 where the pins 22 and 23 come into contact with the lowermost ends of the elongated holes 18 and 20. The opening 14 of the base plate 10 and the finder eyepiece window 16 are closed by the light-shielding plate 12, thereby resulting in the first state (B). The optical path of the finder optical system is interrupted, preventing light from entering into the main body of the camera from the finder eyepiece window 16.

This first state (B) is created before position II where the shutter release button is pressed, and the light-receiving element commences a metering operation. After the creation of the first state (B), the shutter drive member 8 arrives at position II.

It is then detected that the switch 56 is brought into conduction, and the light-receiving element performs a metering operation while the optical path of the finder optical system is interrupted. Thereafter, if the shutter release button is pressed, and the shutter drive member 8 arrives at position III, then the shutter is released.

After the opening 14 has been closed by the light-shielding plate 12, the shutter drive member 8 moves to position III, and the lever 28 pivots in conjunction with the movement of the shutter drive member 8. At this time, the light-shielding plate 12 arrives at the light-shielding position where the pins 22 and 23 are in contact with the lowermost ends of the elongated holes 18 and 20. Therefore, the light-shielding plate 12 cannot move any further. Further, since the light-shielding plate 12 cannot move, the lever 26 cannot pivot any further as well. For these reasons, the light-shielding plate 12 and the lever 26 are held in the first state (B), and only the lever 28 pivots so as to follow the movement of the shutter drive member 8. The end of the torsion spring 50 becomes opened, whereby the lever piece 52 is spaced apart from the pin 44 of the lever piece 38.

Upon release of the finger from the shutter release button, the shutter drive member 8 returns to position I from position III. The light-shielding plate 12 returns to its original position by reversing the foregoing operations, and the opening 14 is opened.

In a case where a photographer takes a picture while looking through the finder eyepiece window 16, it is effective to arrange the automatic eyepiece shutter in such a way as to prevent automatic opening/closing of the optical path of the finder optical system.

As indicated by a two-dot chain line in FIG. 1, such an arrangement can be effected by providing the main body of the camera with a manually-operational lever stop member 68.

The lever stop member 68 is usually positioned in location E where it permits automatic opening/closing by the light-shielding plate 12 of the automatic eyepiece shutter in conjunction with the actuation of the shutter drive member 8. To prevent the automatic closing of the finder eyepiece window 16, the lever block member 68 is manually moved to position F.

As a result, the front end of the lever piece 34 of the lever 26 comes into contact with the lever block member 68, which makes it impossible for the lever 26 to pivot, thereby preventing the light-shielding plate 12 from closing the finder eyepiece window 16.

The photographer can release the shutter while looking the objective through the finder eyepiece window 16.

Figure 2:
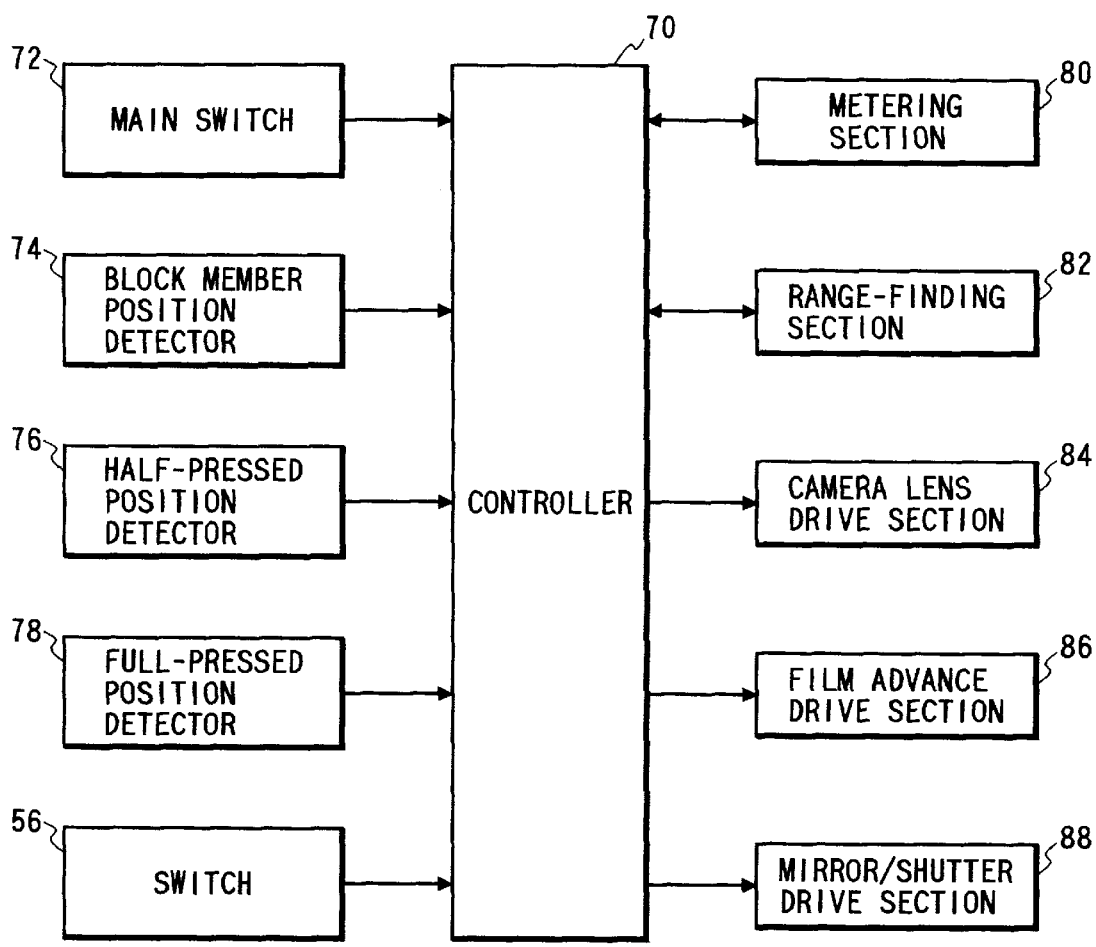
FIG. 2 is a block diagram illustrating the configuration of a control section for controlling the automatic eyepiece shutter and a shutter release button according to the first embodiment.

Next, with reference to a block diagram illustrated in FIG. 2 and a flowchart illustrated in FIG. 3, the operation of the automatic eyepiece shutter according to the first embodiment will be described.

First, the configuration of the circuitry illustrated in FIG. 2 will be described. In FIG. 2, reference numeral 70 designates a controller comprised of a microcomputer. This controller 70 is connected to the switch 56 which detects the closed state of the light-shielding plate 12, a main switch 72 for a camera, a position detector 74 which detects the positions E and F of the lever block member 68, a half-pressed position detector 76 for detecting a half-pressed state of the shutter release button, a fully-pressed position detector 78 for detecting a fully-pressed state of the shutter release button, a metering section 80, a range-finding section 82, a camera lens drive section 84, a film advance drive section 86, and a mirror/shutter drive section 88.

Next, with reference to FIG. 3, the operation of the automatic eyepiece shutter will be described.

Figure 3:
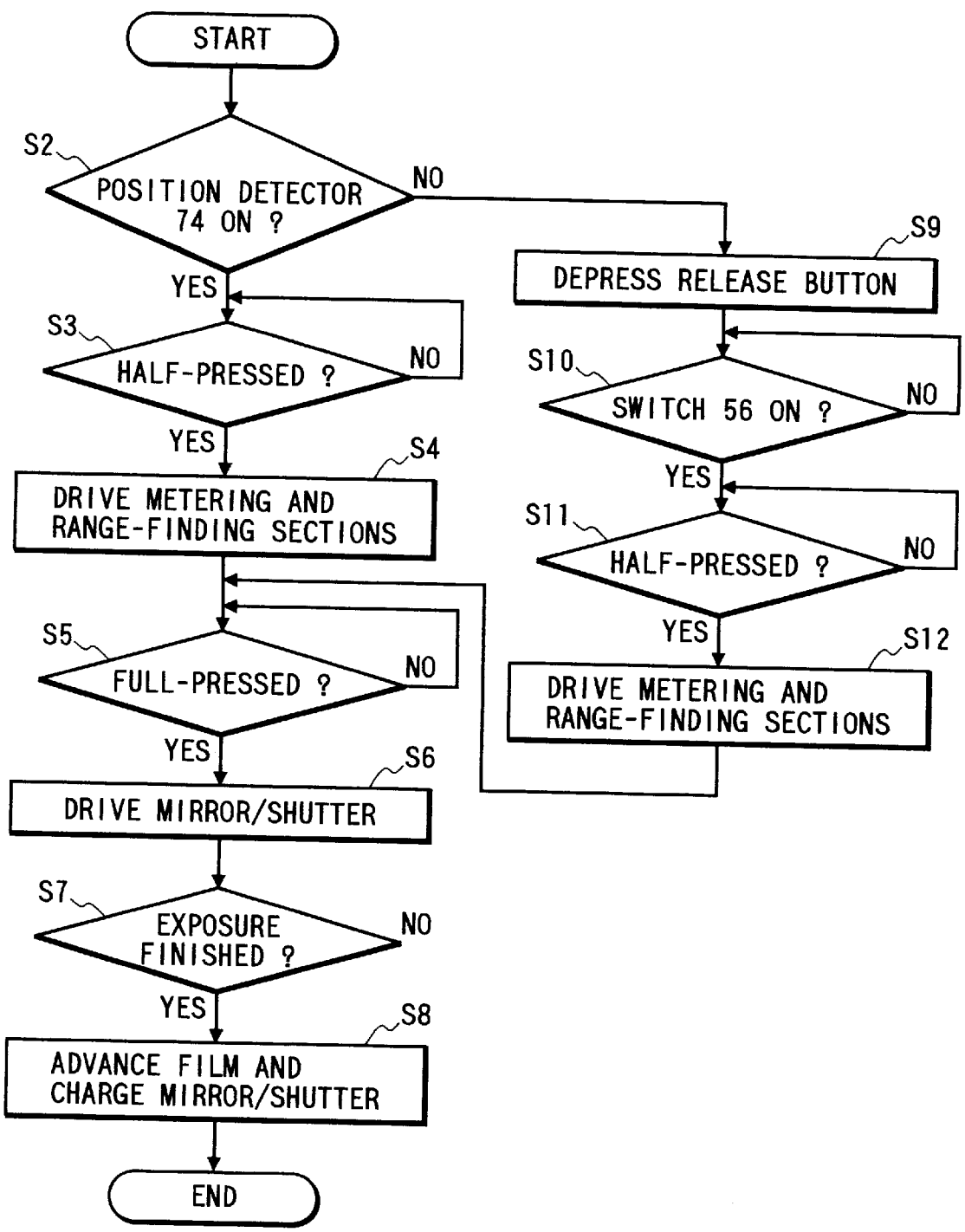
FIG. 3 is a flowchart describing procedures for operating the automatic eyepiece shutter and the shutter release button according to the first embodiment.

First, when the main switch 72 is turned on, the control device 70 is activated to start a program shown in FIG. 3.

In step S2, it is decided whether or not there is an output of an ON-signal from the position detector 74. If it is decided that there is an output of the ON-signal from the fact that the lever block member 68 has been moved to position F in FIG. 1, the processing proceeds to step S3 because the automatic eyepiece shutter cannot close. In contrast, if it is decided that there is not an output of the ON-signal from the fact that the lever block member 68 is located in position E in FIG. 1, the processing proceeds to step S9 because the automatic eyepiece shutter can open/ close in conjunction with the pressing action of the shutter release button.

In step S3, it is decided whether or not the shutter release button has been pressed half according to an ON signal output from the half-pressed position detector 76. If it is decided that the shutter release button has been pressed half, an operation instruction is sent to the metering section 80 and the range-finding section 82 from the controller 70, so that the brightness of an object and the distance between the object and the range-finding section 82 are measured. The lens is focused on the object by controlling the camera lens drive section 84 according to the information about the result of such ranging operation (step S4).

Subsequently, it is decided whether or not the shutter release button has been pressed fully according to an ON-signal output from the fully-pressed position detector 78 (step S5). If it is decided that the shutter release button has been pressed fully, an operation instruction is sent to the mirror/shutter drive section 88 from the controller 70 according to the information about the result of the metering operation, so that the mirror and the shutter are driven (step S6). Next, it is decided in step S7 whether or not the film has finished undergoing exposure. If the film has finished undergoing exposure, an operation instruction is sent to the film advance drive section 86 and the mirror/shutter drive section 88 from the controller 70, whereby a film is advanced by one frame, and the mirror and the shutter are electrically charged (step S8).

In contrast, if it is decided in step S2 that there is not any output of ON-signal from the position detector 74, the processing proceeds to step S9, commencing the depression of the shutter release button. Since the shutter drive member 8 is also moved in conjunction with the pressing action of the shutter release button at this time, the light-shielding plate 12 changes to the first state (B) from the second state (A) in FIG. 1. It is decided whether or not the optical path of the finder has been completely closed by the light-shielding plate 12 as a result of arrival of the shutter drive member 8 at position II in FIG. 1, by permitting the controller 70 to receive an ON-signal from the switch 56 (step S10).

If it is decided that the switch 56 has already been turned on, the processing proceeds to step S11. Then, it is decided whether or not the shutter release button has been pressed half, by permitting the controller 70 to receive the ON-signal from the half-pressed position detector 76. If it is decided that the shutter release button has been pressed half, the processing proceeds to step S12. The controller 70 then sends an operation instruction to the metering section 82 and the range-finding section 80, whereby the brightness of the object and the distance between the object and the range-finding section 82 are measured. The lens is focused on the object by controlling the camera lens drive section 84 according to the information about the result of such ranging operation. Subsequently, the processing proceeds to step S5, and the processing following step S5 will be executed.

By virtue of the automatic eyepiece shutter according to the present invention, the light-shielding plate 12 closes the finder eyepiece window 16 at the time of a metering operation for automatic exposure purposes, so that an optical path of the finder optical system is interrupted. As a result, the incoming light from the finder eyepiece window 16 cannot arrive at the light-receiving element for metering purposes, thereby preventing the incoming light from affecting the metering operation of the light-receiving element.

Consequently, even when the user takes a picture with his eye being remote from the finder eyepiece window 16, it becomes unnecessary to close the finder eyepiece window 16 by manual operations, as is the case with the conventional eyepiece shutter. All that needs to be done is to press the shutter release button.

Further, in the present embodiment, the finder eyepiece window 16 is closed by the light-shielding plate 12 at exposure as well as at the time of the metering operation to thereby interrupt the optical path of the finder optical system. Therefore, a fog can be also prevented.

The positional relationship between the shutter drive member 8, the light-shielding plate 12, and the levers 26 and 28 in vertical and horizontal directions is arbitrarily determined according to the configuration of a camera which employs the automatic eyepiece shutter of the present invention, as required.

Next, with reference to FIGS. 4 and 5, an automatic eyepiece shutter according to a second embodiment of the present invention will be described.

Figure 4:
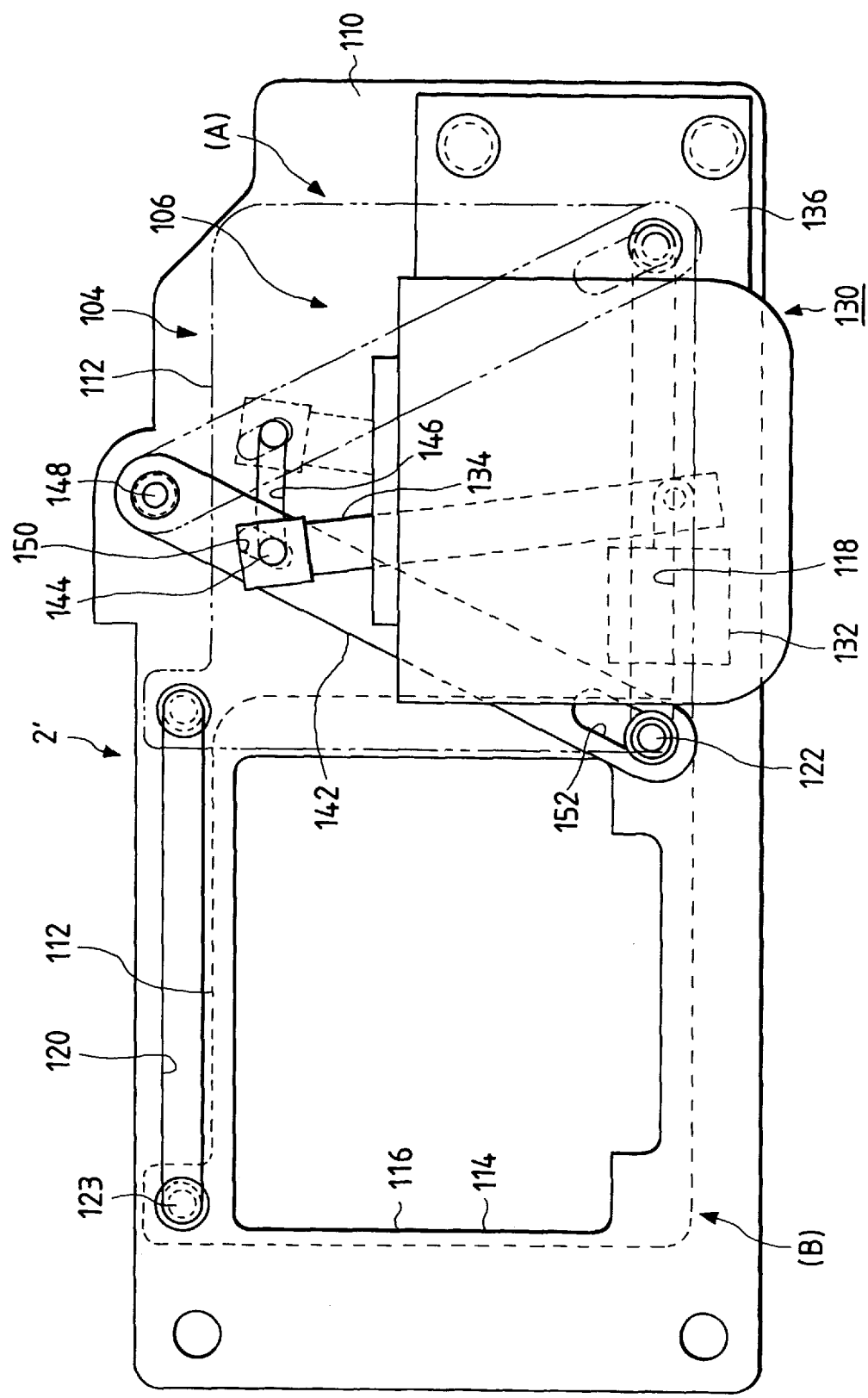
FIG. 4 is a front view of the automatic eyepiece shutter according to a second embodiment of the present invention.
Figure 5:
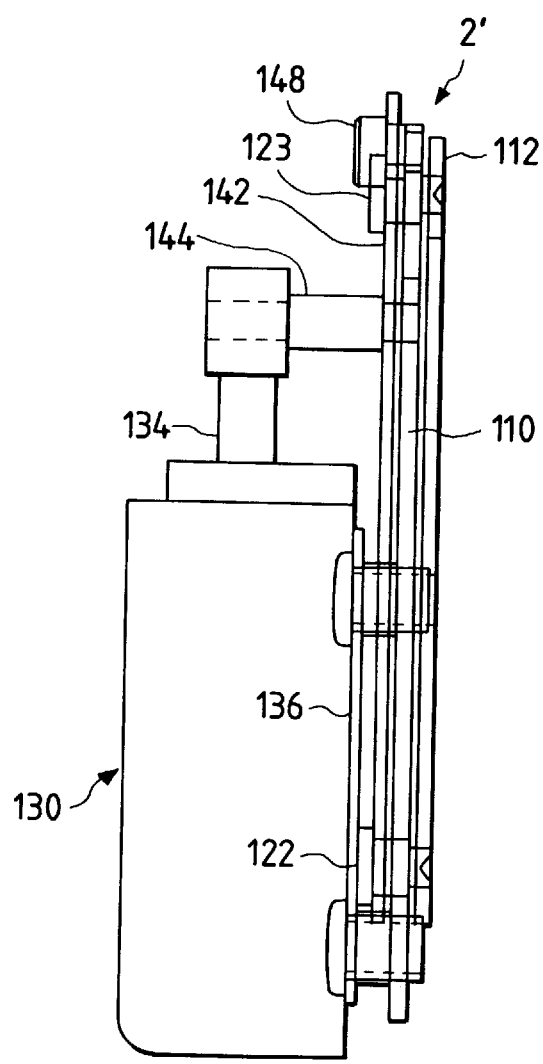
FIG. 5 is a side view of the automatic eyepiece shutter according to the second embodiment.

FIG. 4 is a front view of an automatic eyepiece shutter, and FIG. 5 is a side view of the same.

In the second embodiment, the automatic eyepiece shutter is applied to a camera which uses a pellicle mirror as the major mirror and does not swing up or down the mirror. The automatic eyepiece shutter 2' is comprised of a finder opening/closing means 104, and a drive means 106 for actuating the finder opening/closing means 104. This automatic eyepiece shutter 2' is housed in the main body of the camera.

The finder opening/closing means 104 is comprised of a light-shielding plate 112 (corresponding to the light-shielding member of the present invention) and a base plate 110 for the light-shielding plate 112. A rectangular opening 114 is formed in the base plate 110, and the base plate 110 is located inside with respect to a finder eyepiece window 116 and is fixed to the main body of the camera such that the opening 114 substantially matches with the finder eyepiece window 116.

Elongated holes 118 and 120 are formed at opposite sides with respect to the opening 114 and in lower and upper portions of the base plate 110 so as to be elongated horizontally.

The light-shielding plate 112 is approximately rectangular and has a sufficient area to close the opening 114 of the base plate 110. The light-shielding plate 112 is superimposed on the base plate 110 while the sides of the light-shielding plate 112 are aligned substantially parallel with the respective sides of the opening 114.

Pins 122 and 123 stand upright in lower and upper portions of the light-shielding plate 112 in such a way that the opening 114 is placed substantially between the pins 122 and 123, and the pins 122 and 123 are loosely fitted into the respective elongated holes 118 and 120, respectively.

The drive means 106 is comprised of an electromagnetic plunger 130 and a lever 142.

The electromagnetic plunger 130 is comprised of a solenoid 132, and a pivot arm 134 which pivots by energizing the solenoid 132 in a positive or negative direction. The electromagnetic plunger 130 is attached to the reverse side of the base plate 110 via a support piece 136.

A pin 144 is attached to the distal end of the pivot arm 134, and the pin 144 is fitted into a circular-arc elongated hole 146 formed in the base plate 110. The pivot arm 134 pivots while the pin 144 is guided along the elongated hole 146.

The upper pivotal portion of the lever 142 is pivotally supported by a shaft 148 on the base plate 110 above the pivotal arm 134 of the electromagnetic plunger 130. Elongated holes 150 and 152 are formed in the vicinity of an upper portion and the lower end of the lever 142, respectively.

The pins 144 are fitted into the elongated holes 150 formed in the portions in the vicinity of the upper end of the lever 142, and the lever 142 pivots in conjunction with the pivotal movement of the pivot arm 134.

Pins 122 stood upright in a lower portion of the light-shielding plate 112 are fitted into the elongated hole 152 formed in the lower end of the lever 142. Accordingly, the lever 142 pivots in conjunction with the pivotal movement of the pivot arm 134, so that the light-shielding plate 112 travels back and forth.

When the solenoid 132 of the electromagnetic plunger 130 is energized in a positive direction by application of power, the light-shielding plate 112 moves via the pivot arm 134 and the lever 142 to a light-shielding position (indicated by a dotted line) where the pins 122 and 123 come into contact with the ends of the elongated holes 118 and 120, thereby resulting in a first state (B) in which the opening 114 of the base plate 110 and the finder eyepiece window 116 are closed by the light-shielding plate 112. As a result, the optical path of the finder optical system is interrupted, preventing light from entering into the main body of the camera from the finder eyepiece window 116.

In contrast, when the solenoid 132 of the electromagnetic plunger 130 is energized in a negative direction by application of power, the light-shielding plate 112 moves via the pivot arm 134 and the lever 142 to an open position (indicated by a phantom line) where the pins 122 and 123 come into contact with the other ends of the elongated holes 118 and 120, thereby resulting in a second state (A) in which the light-shielding plate 112 is retracted from the position in front of the opening 114 to thereby open the opening 114.

Figure 6:
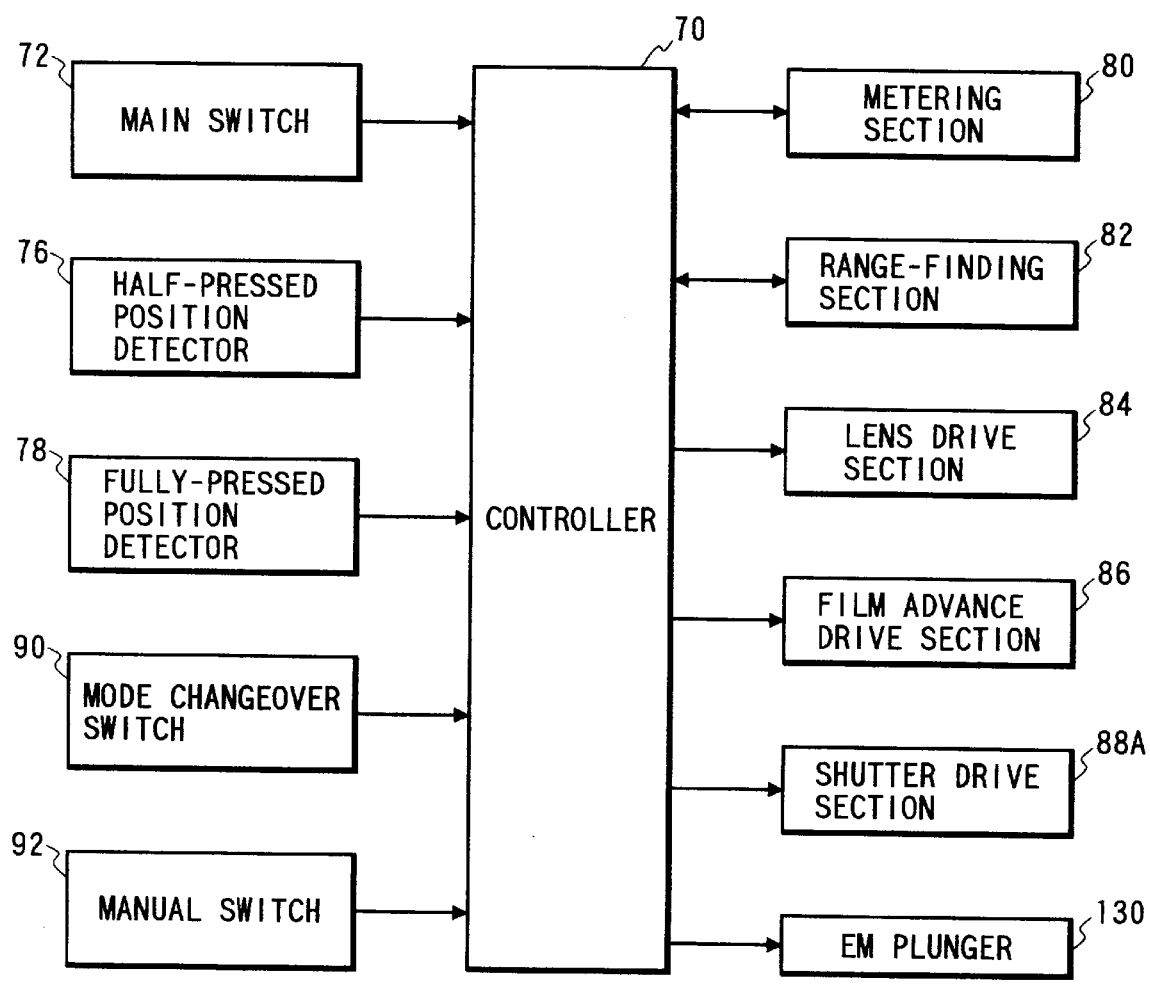
FIG. 6 is a block diagram illustrating the configuration of a control section for controlling the automatic eyepiece shutter and a shutter release button according to the second embodiment.

With reference to a block diagram provided in FIG. 6 and a flowchart provided in FIG. 7, the operation of the automatic eyepiece shutter of the second embodiment will be described.

First, the configuration of the circuitry illustrated in FIG. 6 will be described. In FIG. 6, reference numeral 70 designates a controller consisting of a microcomputer. This controller 70 is connected to a main switch 72 of the camera, the half-pressed position detector 76 for detecting a half-pressed state of the shutter release button, the fully-pressed position detector 78 for detecting a fully-pressed state of the shutter release button, a mode changeover switch 90 for changing the mode of the opening/closing action of the eyepiece shutter between an automatic mode and a manual mode, a manual switch 92 which switches the state of the eyepiece shutter between an open state and a closed state at the time of a metering operation and exposure in the manual mode, the metering section 80, the range-finding section 82, the camera lens drive section 84, the film advance drive section 86, a shutter drive section 88A, and an electromagnetic plunger 130.

Next, with reference to FIG. 7, the operation of the automatic eyepiece shutter will be described.

First, when the main switch 72 is turned on, the control device 70 is activated to start a program shown in FIG. 7.

In step S22, it is decided whether the mode changeover switch 90 is switched to the automatic mode or the manual mode. If it is switched to the automatic mode, the processing proceeds to step S23. In contrast, if it is switched to the manual mode, the processing proceeds to step S31.

In step S23, it is decided whether or not the shutter release button has been pressed half according to an ON signal output from the half-pressed position detector 76. If it is decided that the shutter release button has been pressed half, an operation instruction is sent to the metering section 80 and the range-finding section 82 from the controller 70, so that the brightness of an object and the distance between the object and the range-finding section 82 are measured. The lens is focused on the object by controlling the camera lens drive section 84 according to the information about the result of such ranging operation (step S24).

Subsequently, it is decided whether or not the shutter release button has been pressed fully according to an ON-signal output from the fully-pressed position detector 78 (step S25). If it is decided that the shutter release button has been pressed fully, the processing proceeds to step S26 where it is decided whether or not a TTL direct metering operation is performed through use of an electronic flash. If it is decided that the TTL direct metering operation is not performed through use of an electronic flash, the processing proceeds to step S27. The controller 70 applies an electrical current to the solenoid 132 of the electromagnetic plunger 130 in a positive direction to thereby close the eyepiece shutter.

Next, an operation instruction is sent to the shutter drive section 88A from the controller 70 according to the information about the result of the metering operation received from the metering section 80 so that the mirror and the shutter are driven so as to expose a film to light (step S28). In step S29, the controller 70 applies power to the solenoid 132 of the electromagnetic plunger 130 in a negative direction to thereby open the eyepiece shutter. The processing then proceeds to step S30, and an operation instruction is sent to the film advance drive section 86 and the shutter drive section 88A from the controller 70, whereby a film is advanced by one frame, and the mirror and the shutter are electrically charged.

In contrast, if it is decided in step S22 that the mode changeover switch 90 is switched to the manual mode, the processing proceeds to step S31, and a manual switch 92 is turned on or off. If the manual switch 92 is turned on, the eyepiece shutter 2' is held in an open state at all times. In contrast, if the manual switch 92 is turned off in consideration of the entrance of reverse incoming light, the eyepiece shutter 2' is held in a closed state.

In step S32, it is decided whether or not the shutter release button has been pressed half according to the ON-signal output from the half-pressed position detector 76. If it is decided that the shutter release button has been pressed half, the controller 70 then sends an operation instruction to the metering section 82 and the range-finding section 80, whereby the brightness of the object and the distance between the object and the range-finding section 82 are measured. The lens is focused on the object by controlling the camera lens drive section 84 according to the information about the result of such ranging operation (step S33).

Subsequently, it is decided whether or not the shutter release button has been pressed fully according to the ON-signal output from the fully-pressed position detector 78 (step S34). If it is decided that the shutter release button has been pressed fully, an operation instruction is sent to the mirror/shutter drive section 88 from the controller 70 according to the information about the result of the metering operation, so that the mirror and the shutter are driven to thereby expose the film to light (step S35). Then, in step S36, an operation instruction is sent to the film advance drive section 86 and the mirror/shutter drive section 88 from the controller 70, whereby a film is advanced by one frame, and the mirror and the shutter are electrically charged.

In step S26, if it is decided that a TTL direct metering operation is performed through use of an electronic flash, the processing then proceeds to step S37. The controller 70 applies an electrical current to the solenoid 132 of the electromagnetic plunger 130 in a positive direction to thereby close the eyepiece shutter. Subsequently, exposure is commenced (step S38), and the TTL direct metering operation is performed by causing an electronic flash to provide flash light (step S39). Then, it is decided whether or not the exposure has been completed in step S40. If the exposure has been finished, the processing proceeds to step S29, and the processing following step S29 is executed.

As described above, in the automatic eyepiece shutter 2' according to the second embodiment, the eyepiece shutter is arranged so as to operate in synchronism with the pressing action of the shutter release button; namely, such that a metering operation is performed by pressing the shutter release button half, and the eyepiece shutter is closed by pressing the shutter release button fully. Therefore, it is possible to prevent errors in the quantity of light or a fog during exposure which would be otherwise caused by reverse incoming light at the time of controlling the quantity of flash light for TTL direct metering purposes.

In contrast to the first embodiment, the second embodiment enables changing of an object while looking through the viewfinder after the metering operation has been completed, because the optical path of the finder optical system is left open during the metering operation and is interrupted only during the period of exposure.

If the manual switch 92 becomes opened or closed in the manual mode, the eyepiece shutter 2' can be manually closed or opened as required.

In addition to the configurations disclosed in the first and second embodiments in which the optical path of the finder optical system is closed or opened through use of the light-shielding plate 12 or 112, it is also possible to optically close the optical path of the finder optical system by electrically controlling the liquid-crystal shutter utilizing the pressing action of the shutter release button to thereby prevent external light from entering into the main body of the camera through the finder eyepiece window 16 or 116 at the time of the metering operation and/or exposure.

The positions of the light-shielding plates 12 and 112 and the liquid-crystal shutter; namely, the position of the finder opening/closing means are not limited to the positions of the finder eyepiece windows 16 and 116. They may be positioned anywhere, so long as light entering from the finder eyepiece window 16 or 116 can be prevented from arriving at the photometry light-receiving element or a film being exposed to light.

As described above, according to the present invention, an automatic eyepiece shutter is provided for use with a camera equipped with a TTL-photometry type automatic exposure mechanism having a light-receiving element for metering purposes provided within the main body of the camera. The automatic eyepiece shutter includes finder opening/closing means for creating a first state in which light entered from a finder eyepiece window is prevented from arriving at the light-receiving element by interrupting an optical path of a finder optical system and a second state in which the optical path becomes open, and control means which is operated by a shutter release button and brings the finder opening/closing means to the first state at least at the time of a metering operation for automatic exposure.

Further, according to the present invention, an automatic eyepiece shutter is provided for use with a camera equipped with a finder optical system. The automatic eyepiece shutter includes finder opening/closing means for creating a first state in which an optical path of a finder optical system is interrupted and a second state in which the optical path becomes open, and control means which is operated by a shutter release button and brings the finder opening/closing means to the first state at least at the time of exposure.

By virtue of the automatic eyepiece shutter of the present invention, the finder optical system is automatically closed by pressing the shutter release button, thereby preventing incoming light from the finder eyepiece window from affecting a metering operation or exposure.

Consequently, even when a picture is taken while the photographer's eye is remote from the finder eyepiece window, it becomes unnecessary to close the finder eyepiece window by manual operation, as is the case with the conventional eyepiece shutter. All that needs to be done is to press the shutter release button.

Further, according to the present invention, the automatic eyepiece shutter is arranged in synchronous with a shutter release button such that light is metered by pressing the shutter release button half, and that the finder eyepiece window is closed after the shutter release button has been pressed fully. Therefore, it is possible to prevent errors in the quantity of light or a fog during exposure which would otherwise be caused by inversely incoming light at the time of controlling of the quantity of light of an electronic flash such as a TTL direct metering operation.

What is claimed is:

1. An automatic eyepiece shutter for use with a camera equipped with a TTL-photometry type automatic exposure mechanism, the automatic eyepiece shutter comprising:

finder opening/closing means for creating a first state in which an optical path of a finder optical system is interrupted and a second state in which the optical path becomes open;

control means, operated by a shutter release button, for bringing the finder opening/closing means to the first state at least at the time of metering operation for automatic exposure; and blocking means for preventing the finder opening/closing means from being brought into the first state.

2. An automatic eyepiece shutter for use with a camera equipped with a finder optical system, the automatic eyepiece shutter comprising:

finder opening/closing means for creating a first state in which an optical path of a finder optical system is interrupted and a second state in which the optical path becomes open; and control means, operated by a shutter release button, for bringing the finder opening/closing means to the first state at least at the time of exposure;

wherein the finder opening/closing means is brought into the second state by pressing the shutter release button half-way to perform a metering operation in the second state, and wherein the finder opening/closing means is brought into the first state when the shutter release button is fully pressed;

said automatic eyepiece shutter further comprising blocking means for preventing the finder opening/closing means from being brought into the first state.

3. An automatic eyepiece shutter as defined in claim 1, wherein a metering operation of a photometry light-receiving element is commenced after the finder opening-closing means has been brought into the first state.

4. An automatic eyepiece shutter as defined in claims 1 or 2, wherein the finder opening/closing means includes a light-shielding member for interrupting the optical path, and the first and second states are created by movement of the light-shielding member.

5. An automatic eyepiece shutter as defined in claim 4, wherein the light-shielding member is disposed so as to confront with a finder eyepiece window.

6. An automatic eyepiece shutter as defined in claim 4, wherein the control means includes a linking mechanism for moving the light-shielding member in conjunction with a pressing action of the shutter release button of the camera.

7. An automatic eyepiece shutter as defined in claim 4, wherein said blocking means prevents the finder opening/closing means from being brought into the first state by hindering movement of the light-shielding member.

8. An automatic eyepiece shutter as defined in claim 7, wherein the light-shielding member block means is manually operable.

9. An automatic eyepiece shutter as defined in claims 1 or 2, wherein the control means comprises an electric actuator.

10. An automatic eyepiece shutter as defined in claim 9, wherein the electric actuator includes an electromagnetic plunger.

11. An automatic eyepiece shutter as defined in claims 1 or 2, wherein the finder opening/closing means includes a liquid-crystal shutter capable of permitting passage or interruption of light in the optical path, and the first and second states are created according to variations in an optical state of the liquid-crystal shutter.

12. An automatic eyepiece shutter as defined in claim 11, wherein the control means changes the optical state of the liquid-crystal shutter in conjunction with a pressing action of the shutter release button of the camera.

13. An automatic eyepiece shutter as defined in claim 1 or 2, wherein the camera is a single-lens reflection camera.

14. An automatic eyepiece shutter for use with a single-lens reflection camera comprising:

finder opening/closing means for opening/closing an optical path of a finder optical system in conjunction with a pressing action of a shutter release button of the single-lens reflection camera; and blocking means for preventing the finder opening/closing means from closing the optical path of the finder optical system; and wherein the optical path of the finder optical system is interrupted at least at a time of a metering operation.

15. An automatic eyepiece shutter as defined in 14, wherein the single-lens reflection camera uses a pellicle mirror as the major mirror.

16. An automatic eyepiece shutter as defined in claim 14 or 15, wherein the optical path of the finder optical system further is interrupted at the time of exposure.

17. An automatic shutter for use with a camera having an optical path of a finder optical system and an optical path of an image pick-up system, said optical paths being partially overlapped with each other, said automatic eyepiece shutter comprising:

a release button;

a finder shutter disposed on said optical path of said finder optical system;

a link mechanism driving said finder shutter in response to a motion of said release button; and an override mechanism which prevents the link mechanism from driving said finder shutter upon activating said override mechanism; and wherein said link mechanism drives said finder shutter to isolate a portion of said optical path of said finder optical system from said optical path of said image pick-up system when a metering operation for automatic exposure is carried out.

18. An automatic eyepiece shutter as defined in claim 17, wherein said finder shutter selectively isolates a portion of said optical path of said finder optical system, which extends from a finder eyepiece window, from said optical path of said image pick-up system.

19. An automatic eyepiece shutter as defined in claim 17, wherein said finder shutter includes a base having an opening located on said optical path of said finder optical system and a light shielding plate movably arranged on said base.

20. An automatic eyepiece shutter as defined in claim 17, wherein said finder shutter includes a liquid crystal shutter.

21. An automatic eyepiece shutter as defined in claim 17, wherein said link mechanism further drives said finder shutter to isolate a portion of said optical path of said finder optical system from said optical path of said image pick-up system when an exposure is carried out.

22. An automatic eyepiece shutter as defined in claim 17, wherein said link mechanism mechanically drives said finder shutter.

23. An automatic eyepiece shutter as defined in claim 17, wherein said link mechanism electromagnetically drives said finder shutter.

24. An automatic eyepiece shutter as defined in claim 17, wherein said link mechanism electrically drives said finder shutter.

25. An automatic eyepiece shutter as defined in claim 17, wherein said finder shutter confronts with a finder eyepiece window.

* * * * *